(12) United States Patent
Goodarzi et al.

(10) Patent No.: US 12,420,753 B2
(45) Date of Patent: Sep. 23, 2025

(54) TRAILER PARKING BRAKE SYSTEM AND METHOD

(71) Applicant: GM GLOBAL TECHNOLOGY OPERATIONS LLC, Detroit, MI (US)

(72) Inventors: Avesta Goodarzi, Whitby (CA); Todd J. Brinkman, Rochester Hills, MI (US); Benjamin J. Eles, Goodrich, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 62 days.

(21) Appl. No.: 18/538,249

(22) Filed: Dec. 13, 2023

(65) Prior Publication Data

US 2025/0196819 A1 Jun. 19, 2025

(51) Int. Cl.
| | | |
|---|---|---|
| *B60T 7/20* | (2006.01) | |
| *B60P 3/07* | (2006.01) | |
| *B60T 7/08* | (2006.01) | |
| *B60T 7/16* | (2006.01) | |
| *B60T 8/17* | (2006.01) | |
| *B60T 17/22* | (2006.01) | |

(52) U.S. Cl.
CPC ..................... *B60T 7/20* (2013.01); *B60P 3/07* (2013.01); *B60T 7/08* (2013.01); *B60T 7/16* (2013.01); *B60T 8/1701* (2013.01); *B60T 17/22* (2013.01); *B60T 2230/00* (2013.01); *B60T 2240/00* (2013.01); *B60T 2250/00* (2013.01)

(58) Field of Classification Search
CPC ..... B60T 7/20; B60T 7/08; B60T 7/16; B60T 8/1701; B60T 17/22; B60T 2230/00; B60T 2240/00; B60T 2250/00; B60P 3/07
See application file for complete search history.

(56) References Cited

U.S. PATENT DOCUMENTS

| | | | | |
|---|---|---|---|---|
| 3,840,276 | A * | 10/1974 | Jubenville | B60T 8/248 188/112 A |
| 5,137,414 | A * | 8/1992 | Sloan | B60P 3/07 414/483 |
| 5,782,542 | A * | 7/1998 | McGrath | B60T 8/1708 303/7 |
| 10,086,810 | B2 * | 10/2018 | Binder | B60T 8/72 |
| 11,084,467 | B2 * | 8/2021 | Power | B60T 8/58 |
| 11,420,589 | B2 * | 8/2022 | Brady | H02S 40/38 |
| 11,724,679 | B2 * | 8/2023 | Robertson | B60T 8/172 701/78 |
| 2002/0095251 | A1 * | 7/2002 | Oh | B60T 8/246 701/41 |

(Continued)

FOREIGN PATENT DOCUMENTS

| | | | |
|---|---|---|---|
| DE | 102011118169 A1 * | 5/2013 | ........... B60T 13/662 |
| DE | 102013103068 | 10/2014 | |
| DE | 102020126627 | 5/2021 | |

*Primary Examiner* — Kurt Philip Liethen
(74) *Attorney, Agent, or Firm* — Lorenz & Kopf LLP

(57) ABSTRACT

Methods and systems for preventing unwanted movement of a trailer coupled to a towing vehicle are provided. A method includes obtaining sensor data via one or more sensors of the towing vehicle indicating movement of the towing vehicle and/or trailer, and in response to an indication of movement of the towing vehicle and/or trailer, automatically activating a trailer brake to prevent movement of the trailer.

20 Claims, 3 Drawing Sheets

(56) References Cited

U.S. PATENT DOCUMENTS

| | | | |
|---|---|---|---|
| 2003/0117011 A1* | 6/2003 | Ackley | B60T 13/662 |
| | | | 303/6.01 |
| 2007/0222283 A1* | 9/2007 | Skinner | B60T 7/20 |
| | | | 303/20 |
| 2012/0010779 A1* | 1/2012 | Staufer | B60T 17/22 |
| | | | 701/32.8 |
| 2016/0009288 A1 | 1/2016 | Yu | |
| 2022/0105912 A1* | 4/2022 | Fosdike | B60T 8/58 |
| 2023/0415713 A1* | 12/2023 | van Thiel | B60T 7/20 |

\* cited by examiner

TRAILER PARKING BRAKE SYSTEM AND METHOD

INTRODUCTION

The present disclosure relates to methods and systems for braking of a trailer hitched to a vehicle, and more particularly relates to automatic braking and/or user-directed braking for a set period of time.

Many vehicles are equipped for towing a trailer that is selectively coupled to the vehicle. Some of these vehicles include functionality for controlling the brake signal sent to the trailer to apply a braking force by the trailer brakes. This requires a trailer brake controller that may be original equipment on a vehicle or may be added as an aftermarket product. While driving the vehicle, the trailer brake controller allows the driver to control the intensity of the signal sent to the trailer brakes to suit the operating conditions. When no signal is sent to the trailer brakes, i.e., when the trailer brakes are not powered, the trailer brakes do not brake the trailer.

Thus, when a driver or other operator is not at the driver's seat to manipulate the trailer brake, the trailer brakes are not operable. This situation may be undesirable under certain conditions. For example, the vehicle and trailer may be parked on a significant grade such that the vehicle parking brake may fail to provide sufficient braking force to prevent unwanted movement. Also, when loading a vehicle onto the trailer, the normal force of the towing vehicle rear tires may be reduced due to forces of the towed vehicle on the trailer. In fact, the towing vehicle rear tires may be lifted from the ground surface. As a result, the brakes of the towing vehicle may be ineffective to prevent longitudinal motion of the towing vehicle and trailer.

Accordingly, it is desirable to provide improved methods and systems for activating braking of a trailer that is coupled to a vehicle. The methods and systems may provide for automatic braking of the trailer when movement of the trailer and/or towing vehicle is detected. Additionally or alternatively, the methods and systems may provide for user-directed braking of the trailer. Furthermore, other desirable features and characteristics of the present disclosure will become apparent from the subsequent detailed description and the appended claims, taken in conjunction with the accompanying drawings and the foregoing technical field and background.

SUMMARY

In one embodiment, a method for preventing unwanted movement of a trailer coupled to a towing vehicle is provided. The method includes obtaining sensor data via one or more sensors of the towing vehicle indicating movement of the towing vehicle and/or trailer; and in response to an indication of movement of the towing vehicle and/or trailer, automatically activating a trailer brake to prevent movement of the trailer.

In certain embodiments, the method further includes loading a towed vehicle onto the trailer, wherein obtaining sensor data via one or more sensors of the towing vehicle indicating movement of the towing vehicle and/or trailer is performed while loading the towed vehicle onto the trailer.

In certain embodiments of the method, obtaining sensor data via one or more sensors of the towing vehicle indicating movement of the towing vehicle and/or trailer includes obtaining sensor data via one or more sensors of the towing vehicle indicating movement of the towing vehicle or indicating rotation of a front wheel of the towing vehicle.

In certain embodiments of the method, obtaining sensor data via one or more sensors of the towing vehicle indicating movement of the towing vehicle and/or trailer includes obtaining sensor data from an inertial measurement unit (IMU).

In certain embodiments, the method further includes communicating an alert that the trailer brake has been automatically activated to a vehicle operator.

In certain embodiments, the method further includes automatically de-activating the trailer brake after a predetermined period of time.

In certain embodiments of the method, automatically activating the trailer brake to prevent movement of the trailer further includes automatically activating a parking brake of the towing vehicle.

In certain embodiments of the method, the towing vehicle is in parking position and is turned OFF.

In certain embodiments of the method, the towing vehicle is in parking position and is turned ON.

In certain embodiments of the method, a control module determines that the towing vehicle and/or trailer is moving and directs activation of the trailer brake to prevent movement of the trailer.

In certain embodiments of the method, the control module determines that the trailer is connected to the towing vehicle: determines whether the towing vehicle is OFF or ON; determines that the towing vehicle is in a park position or a neutral position: determines whether the sensor data is within calibratable values; and activates a trailer brake power module to activate the trailer brake to prevent movement of the trailer.

In certain embodiments of the method, the control module activates a parking brake of the towing vehicle if the parking brake is not activated.

In certain embodiments of the method, the control module activates the trailer brake independently without manual input.

In another embodiment, a system for braking a trailer connected to a towing vehicle is provided. The system includes a trailer brake operative to prevent rotation of wheels of the trailer, wherein the trailer brake is OFF when unpowered: a trailer brake power module coupled to the trailer brake to selectively provide power to the trailer brake; and a switch operable by an operator to activate the trailer brake power module to selectively provide power to the trailer brake for a selected period of time.

In certain embodiments of the system, the switch is remote from the towing vehicle.

In certain embodiments, the system, further includes one or more sensors of the towing vehicle configured to obtain sensor data indicating movement of the towing vehicle and/or trailer; and a control module configured to determine whether the trailer brake is activated, to determine whether the towing vehicle and/or trailer is moving based on the sensor data, and to automatically activate the trailer brake power module to selectively provide power to the trailer brake for a selected period of time when the trailer brake is not activated and the towing vehicle and/or trailer is moving.

In certain embodiments, the system further includes one or more sensors of the towing vehicle configured to obtain sensor data indicating movement of the towing vehicle and/or trailer: a control module, wherein the control module is configured to determine that the trailer is connected to the towing vehicle; determine whether the towing vehicle is OFF or ON; determine that the towing vehicle is in a park position or a neutral position: determine whether the trailer brake is activated; determine whether the sensor data is within calibratable values; and activate the trailer brake power module to activate the trailer brake to prevent movement of the trailer for a selected period of time.

In certain embodiments of the system, the control module is configured to communicate an alert that the trailer brake has been automatically activated to the operator.

In another embodiment, a vehicle is provided and includes a vehicle body configured to be coupled to a trailer having a trailer brake: one or more sensors configured to obtain sensor data for the vehicle: a processor that is coupled with the one or more sensors and that is configured to determine that the trailer is connected to the vehicle; determine whether the vehicle is OFF or ON: determine that the vehicle is in a park position or a neutral position; determine whether the trailer brake is activated; determine from the sensor data whether the vehicle and/or the trailer is moving: activate the trailer brake to prevent movement of the trailer for a selected period of time; and communicate an alert that the trailer brake has been automatically activated to a vehicle operator.

In certain embodiments, the vehicle further includes a manual switch operable by the vehicle operator to activate the trailer brake for a selected period of time.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the application and uses of embodiments herein. Furthermore, there is no intention to be bound by any expressed or implied theory presented in the preceding introduction, brief summary or the following detailed description. As used herein, the term "module" refers to any hardware, software, firmware, electronic control unit or component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of automated driving systems including cruise control systems, automated driver assistance systems and autonomous driving systems, and that the vehicle system described herein is merely one example embodiment of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
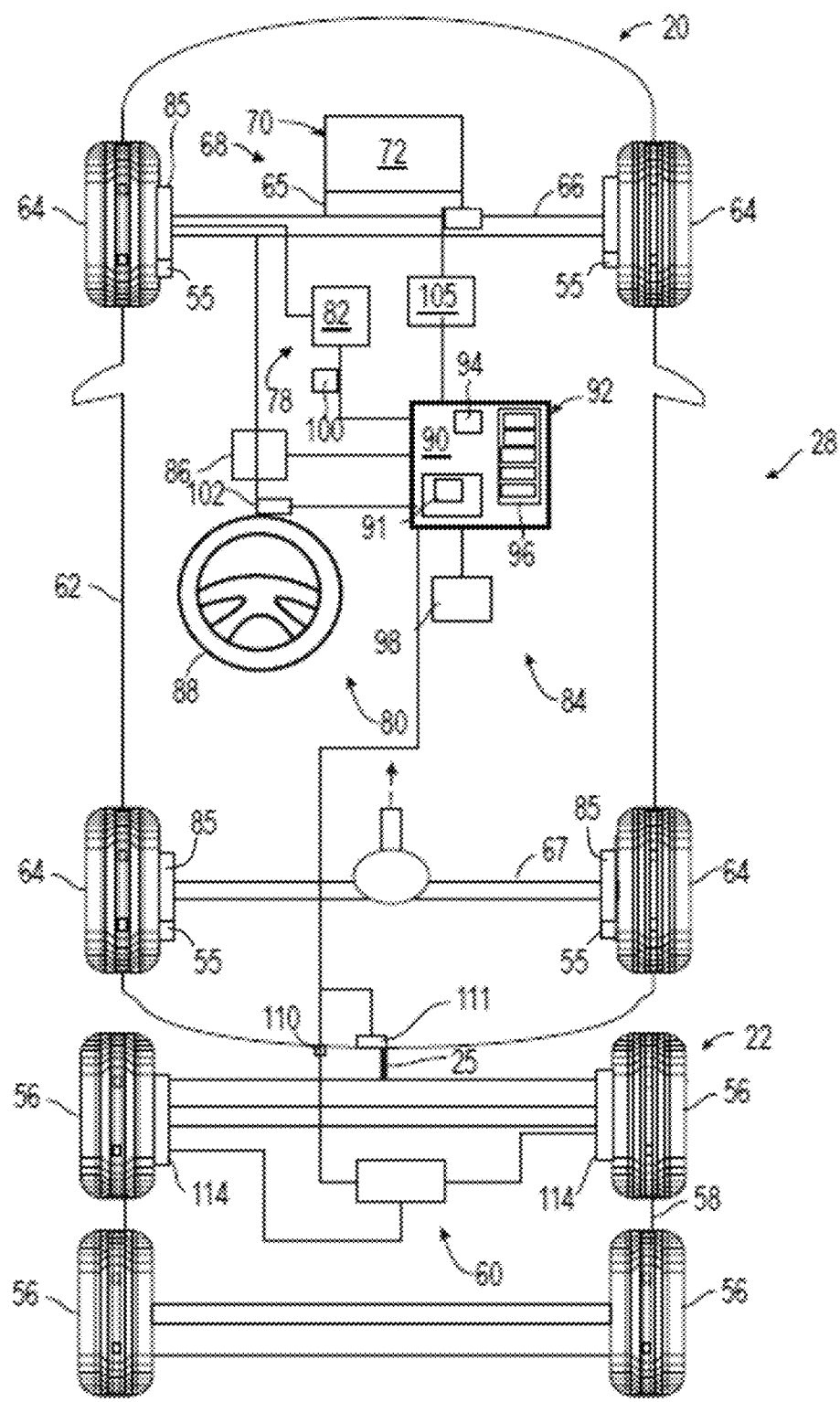
FIG. 1 is a functional block diagram of a vehicle-trailer system, in accordance with exemplary embodiments.

With reference to FIG. 1, certain features of a vehicle-trailer system 28 are illustrated in functional block diagram form, including a vehicle 20 and a trailer 22. It will be appreciated that the vehicle 20 is adapted to operate as a towing vehicle or tow-vehicle for towing a trailer, such as the trailer 22. In various embodiments, the vehicle 20 is an automobile. The vehicle 20 may be any one of a number of different types of automobiles, such as, for example, a sedan, a wagon, a van, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain embodiments. In certain embodiments, the vehicle 20 may also comprise another type of mobile platform.

In various embodiments, the trailer 22 may comprise any number of different types of trailers and/or other types of mobile platforms, for example that are coupled to the vehicle 20 and move along with the vehicle 20. As depicted in FIG. 1, in various embodiments, the trailer 22 includes, among other features, a plurality of wheels 56, a body 58, a braking system 60, and trailer brakes 114. The trailer brakes 114 may be of any suitable design. For example, the trailer brakes 114 may be electric or electro-hydraulic. While the trailer 22 is depicted as having four wheels 56, it will be appreciated that the number of wheels 56 may vary in different embodiments.

The trailer 22 may be releasably coupled with the vehicle 20 by a connector 25 for travel over a roadway. The connector 25 may be configured as any of various types including a fifth-wheel coupling, a tow bar, a tow hitch, ball-type, goose-neck, etc. As used herein, "vehicle" may refer to a host vehicle, such as the vehicle 20, that tows a towed vehicle "trailer," such as the trailer 22. The term towing vehicle or tow-vehicle may also be used to refer to the vehicle 20 doing the towing. In embodiments, a motorized automobile may serve as the vehicle 20 towing the trailer 22 in a vehicle-trailer system 28. The trailer 22 is illustrated for representation purposes and may be any mobile apparatus being towed by the vehicle 20, such as a boat trailer, a camping trailer, a utility trailer, a specialized type of mobile equipment, etc.

As depicted in FIG. 1, the vehicle 20 includes a body 62 that is arranged on or integrated with a chassis. The body 62 substantially encloses other components of the vehicle 20. The vehicle 20 also includes a plurality of wheels 64. The wheels 64 are each rotationally coupled to the chassis near a respective corner of the body 62 to facilitate movement of the vehicle 20. In one embodiment, the vehicle 20 includes four wheels 64, although this may vary in other embodiments (for example for trucks and certain other vehicles).

A drive system 68 is mounted in the vehicle 20, and drives the wheels 64, for example via axles 66, 67. In certain embodiments, the drive system 68 comprises a propulsion system 70. In certain exemplary embodiments, the propulsion system 70 comprises a powerplant 72, such as an internal combustion engine and/or an electric motor/generator, that is coupled with a transmission 65. In certain embodiments, the drive system 68 may vary, and/or two or more drive systems 68 may be used. By way of example, the vehicle 20 may also incorporate any one of, or combination of, a number of different types of propulsion systems 70, such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, a combustion/electric motor hybrid engine, and an electric motor.

As depicted in FIG. 1, the vehicle 20 also includes a braking system 78 in various embodiments. In exemplary embodiments, the braking system 78 controls braking of the vehicle 20 using an actuator 82 that may be controlled via inputs provided by a driver, such as through a brake pedal as the actuator 82, and in certain embodiments, via automatic control by a control system 84. The braking system 78 includes brakes, such as brake 85, at any of the number of wheels 64. Further, the vehicle 20 may include sensors 55 for obtaining sensor data indicating movement, or non-movement, of the vehicle 20. For example, the sensors 55 may be inertial measurement units (IMUs). Sensors 55 may monitor rotation of the wheels 64, such as rotation of rear wheels 64 and/or rotation of front wheels 64.

As depicted in FIG. 1, the vehicle 20 also includes a steering system 80 in various embodiments. In exemplary embodiments, the steering system 80 controls steering of the vehicle 20 via an actuator 86, such as with inputs from a steering wheel 88 (e.g., in connection with a steering column coupled to the axle 66 and/or the wheels 64), that are controlled via inputs provided by a driver, and in certain embodiments via automatic control via the control system 84.

In the embodiment depicted in FIG. 1, the control system 84 is coupled with various systems including the braking system 78 and the steering system 80 of the vehicle 20, as well as with the braking system 60 of the trailer 22.

In various embodiments, the control system 84 may also be coupled to one or more other systems and/or components of the vehicle 20 and/or the trailer 22 and includes a control module or controller 90 and an automatic braking module 91. As illustrated in FIG. 1, the controller 90 and the automatic braking module 91 are a part of, or comprise, a computer system 92. It will be appreciated that the controller 90 may otherwise differ from the example depicted in FIG. 1. The controller 90 may be configured as any number of controllers and/or microcontrollers in communication with each other. The automatic braking module 91 may be integrated with the controller 90, or may be separate from the controller 90 and may be coupled therewith and with the trailer braking system 60.

As illustrated in FIG. 1, the controller 90 is coupled with various devices and systems of the vehicle 20, such as the braking system 78 and the steering system 80. The controller 90 may accept information from various sources, process that information, and provide control commands based thereon to effect outcomes such as operation of the vehicle 20 and its systems, including of the braking system 78. In the depicted embodiment, the controller 90 includes a processor 94 and a memory device 96, and is coupled with a storage device 98. The processor 94 performs the computation and control functions of the controller 90, and may comprise any type of processor or multiple processors, single integrated circuits such as a microprocessor, or any suitable number of integrated circuit devices and/or circuit boards working in cooperation to accomplish the functions of a processing unit. During operation, the processor 94 may execute one or more programs and may use data, each of which may be contained within the storage device 98 and as such, the processor 94 controls the general operation of the controller 90 in executing the processes described herein, such as the processes and methods described in greater detail below.

The memory device 96 may be any type of suitable memory. For example, the memory device 96 may include volatile and nonvolatile storage in read-only memory (ROM), random-access memory (RAM), and keep-alive memory (KAM), for example. KAM is a persistent or non-volatile memory that may be used to store various operating variables while the processor 94 is powered down. The memory device 96 may be implemented using any of a number of known memory devices such as PROMs (programmable read-only memory), EPROMs (erasable PROM), EEPROMs (electrically erasable PROM), flash memory, or any other electric, magnetic, optical, or combination memory devices capable of storing data, some of which represent executable instructions, used by the controller 90. In the depicted embodiment, the memory device 96 may store the above-referenced programs along with one or more stored values of the data such as for short-term data access.

The storage device 98 stores data, such as for long-term data access for use in automatically controlling the vehicle 20 and its systems. The storage device 98 may be any suitable type of storage apparatus, including direct access storage devices such as hard disk drives, flash systems, floppy disk drives and optical disk drives. The storage device 98 comprises a non-transitory computer readable medium configured to store programs and data, such as on parameters of the vehicle 20 and the trailer 22. In one exemplary embodiment, the storage device 98 comprises a source from which the memory device 96 receives the programs that execute one or more embodiments of one or more processes of the present disclosure. In another exemplary embodiment, the programs may be directly stored in and/or otherwise accessed by the memory device 96. The programs represent executable instructions, used by the controller 90 in processing information and in controlling the vehicle 20 and its systems, including the braking system 78. While the components of the control system 84 are depicted as being part of the same system, it will be appreciated that in certain embodiments these features may comprise multiple systems. In addition, in various embodiments the control system 84 may comprise all or part of, and/or may be coupled to, various other vehicle devices and systems, such as, among others, the propulsion system 70 and/or other systems of the vehicle 20.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 94) to perform and execute the program. Such a program product may take a variety of forms, and the present disclosure applies equally regardless of the particular type of computer-readable signal bearing media used to carry out the distribution. Examples of signal bearing media include recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system 92 of the controller 90 may also otherwise differ from the embodiment depicted in FIG. 1.

The controller 90 is coupled with various actuators including the actuators 82, 86 and the propulsion system 70. The controller 90 is also coupled with various sensors that sense observable conditions of the vehicle-trailer system 28. In this embodiment, the sensing devices include, but are not limited to, a braking sensor 100 such as a pedal position sensor, a steering angle sensor 102, an acceleration sensor, such as an inertial measurement unit (IMU) 55, and a torque request sensor 105, such as at the accelerator pedal or throttle. Optionally, the sensing devices may include a tow load sensor 111. The IMU 55 may include accelerometers and gyroscopes, which may be in electronic form to provide motion, position, and navigational sensing over a number of degrees of freedom. For example, microelectromechanical system (MEMS) devices may be used to sense translation such as surge, heave, sway and rotation such as roll, pitch and yaw.

In various embodiments, the IMU 55 measures inertial measurement data and/or related parameters of the vehicle 20, which may include movement, acceleration, and a grade or slope on which the vehicle 20 is located. In certain embodiments, the optional tow load sensor 111 may measure force at the connector 25, such as between the trailer 22 and the vehicle 20.

In various embodiments, the controller 90 is coupled to, among other devices, the sensors, the braking system 78 of the vehicle 20, and the braking system 60 of the trailer 22. For example, the trailer 22 may be electrically coupled with the vehicle 20 through a connector 110, such as a multi-pin electrical connector. In certain embodiments, the controller 90 may also be coupled with the steering system 80, the propulsion system 70, and/or one or more other systems, devices, and/or components of the vehicle 20 and/or the trailer 22.

As shown, the controller 90 may receive brake pedal input or vehicle brake pressure from the braking sensor 100 as sensor data inputs for trailer brake control.

In various embodiments, the controller 90 receives sensor data, processes the sensor data, and controls braking of the vehicle 20 and of the trailer 22 (via the vehicle braking system 78 and the trailer braking system 60, respectively), based on the processing of the sensor data, such as described further below.

It is noted that FIG. 1 describes controller 90 as being an integrated controller that controls both the vehicle brakes 85 and the trailer brakes 114. In some embodiments, the control of the vehicle brakes 85 and the trailer brakes 114 may be performed by separate control systems.

Figure 2:
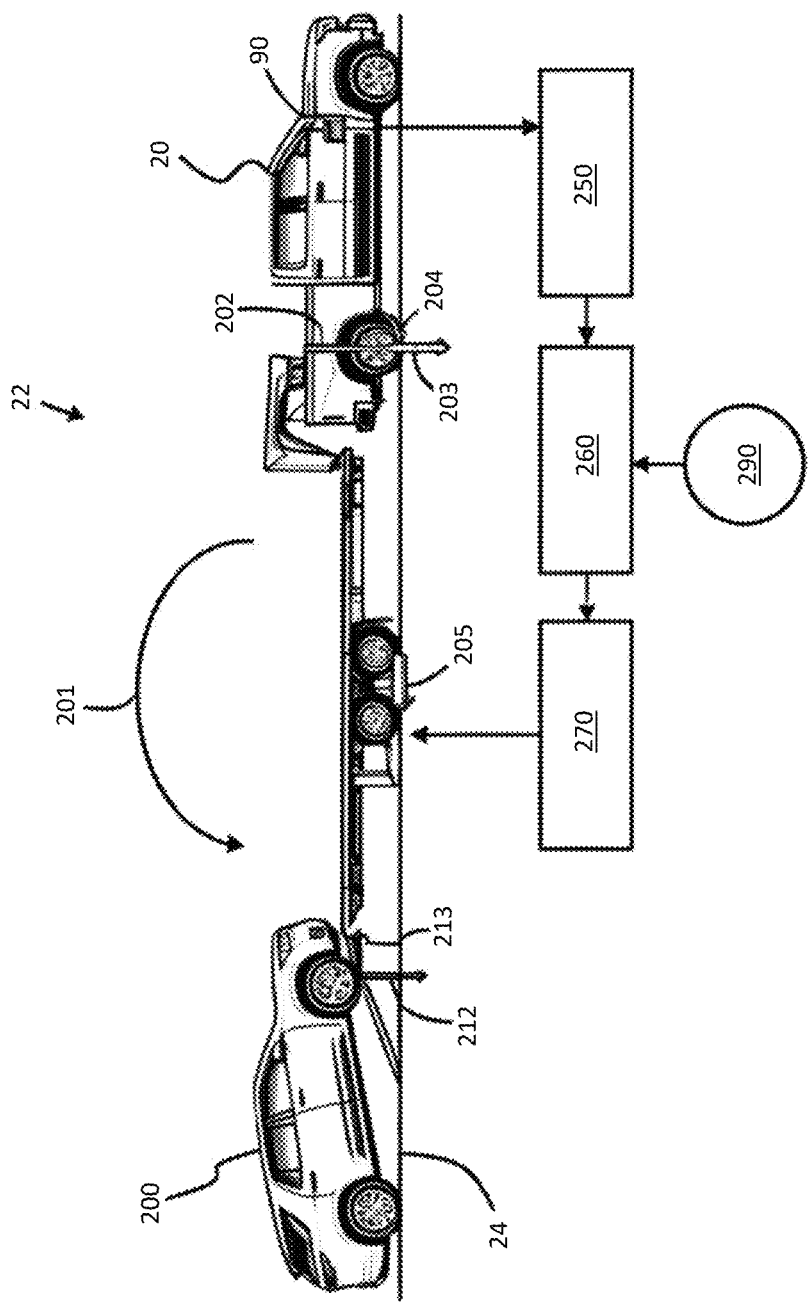
FIG. 2 is a schematic illustration of a vehicle-trailer system showing various parameters, in accordance with exemplary embodiments.

Referring to FIG. 2, the vehicle-trailer system is schematically illustrated with the vehicle 20 connected to the trailer 22 and parked on a roadway 24. As shown, the vehicle 20 is stationary, with an emergency brake or parking brake 85 (see FIG. 1) at the rear wheels 64 (see FIG. 1) preventing movement of the vehicle 20 and trailer 22. A normal force 203 is directed from the vehicle 20 to the road surface 24 at the rear wheel.

As shown in FIG. 2, a second vehicle 200, i.e., a vehicle to be towed or a towed vehicle, is driven onto a ramp and onto the trailer 22. As a result, a normal force 212 is directed from the towed vehicle 200 onto the ramp of the trailer 22. As a result, the trailer 22 may pivot about its wheels 56 (see FIG. 1) in the direction of arrow 201, and exert a force 202 on the towing vehicle 20 at the connector 25 (see FIG. 1) opposite to normal force 203. At the same time, the towed vehicle 200 may exert a longitudinal force 213 onto the trailer 22.

If the longitudinal force 213 is greater than a maximum braking force 204 of the vehicle 20, then the towed vehicle 200 will cause the trailer 22 and towing vehicle 20 to move longitudinally.

Further, the application of the force 202 on the vehicle 20 reduces the friction force between the vehicle 20 and the road surface 24, thereby reducing the maximum braking force 204. In certain cases, the force 202 may be sufficient to lift the rear wheels of the vehicle 20 off of the road surface 24 such that the braking force 204 is zero.

Embodiments herein are provided to activate trailer brakes 114 (see FIG. 1) to prevent longitudinal movement of the trailer 22 and vehicle 20, such as when loading a vehicle 200 onto the trailer 22. In certain embodiments, the controller 90 automatically activates the trailer brakes 114, such as when movement of the vehicle 20 and/or trailer 22 is detected. In other embodiments, a user may manually activate the trailer brakes 114 such as be communicating a signal to the controller 90. While certain embodiments herein are described with respect to an active loading situation, it is noted that the automatic and/or manual-directed parking brake systems and methods are not limited to use during loading of a vehicle onto the trailer. Rather, the systems and methods may be utilized at any time braking of the trailer is desired to prevent unwanted movement.

Cross-referencing FIGS. 1 and 2, the controller 90 may receive sensor data, such as from IMUs 55, that the front wheels 64 are rotating-indicating movement of the vehicle 20. It is noted that rotation of the front wheels 64 may more accurately indicate vehicle movement as compared to rotation of the rear wheels 64, as the rear wheels 64 may be lifted from the road surface 24 and not be rotating despite longitudinal movement of the vehicle 20. Within the controller 90, emergency trailer parking brake activation logic 250 may receive the sensor data and determine whether the vehicle 20 has moved, is moving, or is in danger of moving.

The emergency trailer parking brake activation logic 250 may communicate a signal to an internal trailer brake controller 260. The internal trailer brake controller 260 may in turn activate the trailer brake power module 270. When activated, the trailer brake power module 270 directs power to the trailer brakes 114. If the vehicle parking brake 85 is not activated, the system will activate both the trailer brakes 114 and the vehicle parking brakes 85. In certain embodiments, each trailer brake 114 is applied at 100% braking power of the trailer brake 114. In other embodiments, each trailer brake 114 is applied at partial activation sufficient to prevent motion of the trailer 22.

As a result, a braking force 205 is applied on the trailer 22 by the trailer brakes 114 and is greater than the longitudinal force 213 applied on the trailer 22 by the towed vehicle 200. While the rear axle of the vehicle 20 may be lifted due to the force 202 even after application of the trailer brakes 114, the vehicle brakes are no longer needed because the trailer brakes 114 are sufficient to hold the vehicle 20 and trailer 22 in place. Further, the trailer wheels 56 are not in danger of being lifted from the road surface 24 by forces from the towed vehicle 200.

It is noted that the trailer brake power module 270 uses power from the battery of the vehicle 20. Thus, the trailer brakes 114 may eventually drain the battery and be deactivated due to having no source of power. Further, long term activation of the trailer brakes 114 may also damage the trailer brake power module 270. In order to avoid draining the battery and/or prevent damage to the trailer brake power module 270, the controller 90 may activate the trailer brake power module 270 for only a set period of time. Further, the controller 90 may communicate a signal to a user interface 290 indicating that the trailer brakes 114 have been automatically activated for the set period of time.

Still cross-referencing FIGS. 1 and 2, another mode of operation is provided. Specifically, a user may use the user interface 290 to activate the trailer brakes 114 for a set or predetermined period of time. The user may activate the trailer brakes 114 from a remote position, i.e., from a position outside of the towing vehicle 20. Alternatively, the user may activate the trailer brakes 114 from the driver's seat of the vehicle 20. However, the user need not remain in the driver's seat of vehicle 20, as the trailer brakes 114 are activated for a set period of time and do not require constant manipulation, such as holding a brake at a depressed configuration. The use interface 290 may include a driver interface in the towing vehicle 20, a mobile phone application located on the user's mobile device or phone. The user interface 290 may comprise a software switch or soft switch, or a physically manipulable switch, i.e., a hard switch.

As shown in FIG. 2, the user may communicate a signal from the user interface 290 to the internal trailer brake controller 260. The internal trailer brake controller 260 may in turn activate the trailer brake power module 270. When activated, the trailer brake power module 270 directs power to the trailer brakes 114. Again, the trailer brake power module 270 may power the trailer brakes 114 for a set or selected period of time. Such a mode of operation allows a single user to load a vehicle 200 onto trailer 22, as it is not necessary for a second person to be in the towing vehicle 20 during activation of the trailer brakes 114.

While FIG. 2 illustrates a level road surface 24 and a loading operation, the system and methods described herein are not limited to use on level road surfaces 24 or to loading operations. For example, when parking on a grade, the parking brake of the vehicle 20 may not be sufficient to prevent movement of the trailer 22 and vehicle 20. Thus, the controller 90) may automatically activate the trailer brakes 114 when movement is detected or a user may use the user interface 290 to activate the trailer brakes 114 for a set period of time.

Cross-referencing FIGS. 1 and 2, a method for preventing unwanted movement of a trailer 22 coupled to a towing vehicle 20 is shown. The method includes loading a towed vehicle 200 onto the trailer 22: while loading the towed vehicle 200 onto the trailer 22, obtaining sensor data via of the towing vehicle 20 indicating movement of the towing vehicle 20) and/or trailer 22; and, in response to an indication of movement of the towing vehicle 20 and/or trailer 22, automatically activating a trailer brake 114 to prevent movement of the trailer 22. In the method, the sensor data indicates rotation of a front wheel 64 of the towing vehicle 20. In the method, the sensor data may be obtained from an inertial measurement unit (IMU) 55. The method may further include alerting or communicating an alert that the trailer brake has been automatically activated to a vehicle operator. The alert may be communicated through the user interface 290, such as through the driver information center (DIC), through a touchscreen, through a key fob, or through a mobile software application, such as a phone "app". Additionally or alternatively, the alert may be communicated by flashing the vehicle lights or by activating the vehicle horn. The method may further include automatically de-activating the trailer brake 114 after a pre-determined period of time. The method may further include alerting or communicating an alert that the trailer brake will be de-activated to the vehicle operator.

In certain embodiments, the method may be performed when the towing vehicle is in park position or neutral and is turned OFF or when the towing vehicle is in park position or neutral and is turned ON.

In certain embodiments, the control module 90 determines that the towing vehicle 20 and/or trailer 22 is moving and directs activation of the trailer brake 114 to prevent movement of the trailer 22.

Cross-referencing FIGS. 1 and 2, a system for braking a trailer 22 connected to a parked towing vehicle 20 includes a trailer brake 114 operative to prevent rotation of wheels 64 of the trailer 22. The trailer brake 114 is OFF or in an OFF or deactivated state when unpowered and is ON or in an ON or activated state when powered. The system includes a trailer brake power module 270 coupled to the trailer brake to selectively provide power to the trailer brake. The system includes a switch 290 operable by an operator to activate the trailer brake power module 270 to selectively provide power to the trailer brake 114 for a selected period of time. As described above, the switch 290 may be remote from the towing vehicle 20 or may be in the towing vehicle 20.

Figure 3:
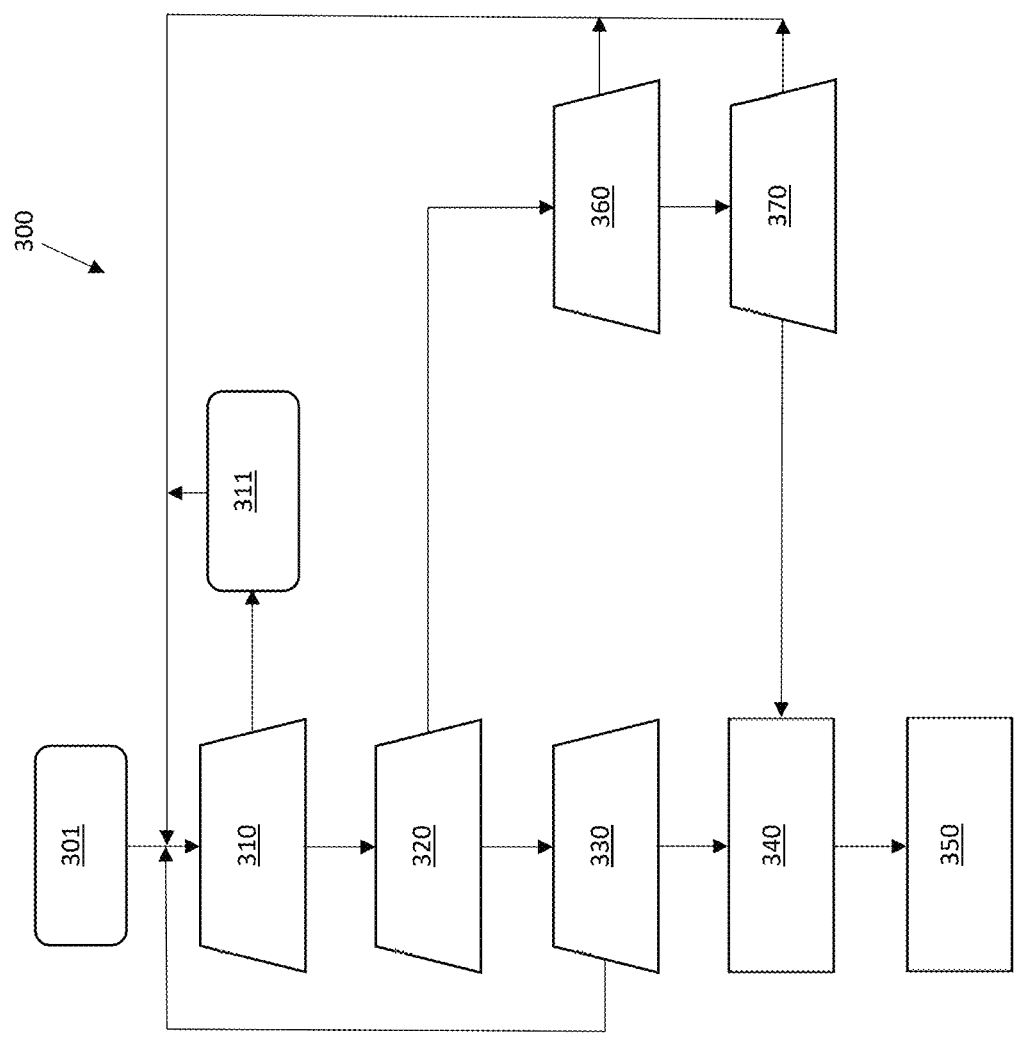
FIG. 3 is a flowchart of a method for braking the trailer of the vehicle-trailer system of FIGS. 1 and 2, in accordance with exemplary embodiments.

Referring now to FIG. 3, an algorithm 300 for the control module 90 for automatic application of the trailer brakes 114 is provided. As shown, the algorithm 300 begins at starting operation 301.

At query 310, the algorithm 300 queries whether the trailer 22 is connected to the vehicle 20. If no, the algorithm 300 may wait at operation 311.

When the algorithm 300 determines that the trailer 22 is connected to the vehicle 20, then the algorithm proceeds to query 320. For example, connection between the trailer 22 and the vehicle 20 may be detected through the voltage decreasing due to the trailer circuit electrical resistance.

At query 320, the algorithm 300 queries whether the vehicle 20 is OFF. If yes, the vehicle 20 is OFF, then algorithm 300 proceeds to query 330.

At query 330, the algorithm 300 queries whether the vehicle is moving, i.e., whether unwanted vehicle motion is detected. If yes, the vehicle 20 is moving, then algorithm 300 proceeds to operation 340.

In certain embodiments, at query 330, the algorithm 300 determines whether the vehicle is moving by comparing sensor data to saved or calibratable values. For example, the sensor data may be provided by an IMU and at query 330 the algorithm determines whether the IMU acceleration data is greater than a saved value.

At operation 340, algorithm 300 activates the trailer brake power module. Activation of the trailer brake power module may cause, at operation 350, stopping motion of the trailer and vehicle by setting the trailer brake duty cycle, such as at 100% or at partial activation sufficient to prevent motion of the trailer 22: activating the trailer brake 114; activating the vehicle parking brake 85 if it is not active: alerting the user such as via DIC, touch screen, flashing, honking, or through a mobile ap: waiting for the user to de-activate the trailer brake for a calibratable maximum time period; and, if the user does not de-activate the trailer brake during the calibratable maximum time period, de-activating the trailer brake after the calibratable maximum time period. It is noted that the algorithm may determine the calibratable maximum time period based on the remaining power in the vehicle power supply, i.e., battery, and based on the power draw of the trailer brake, and/or based on limiting the time period to prevent damage to the trailer brake power module 270.

From query 330, if the algorithm 300 determines that no, the vehicle 20 is not moving, then algorithm 300 may restart with query 310.

From query 320, if the algorithm 300 determines that, no, the vehicle 20 is not OFF, then algorithm 300 proceeds to query 360.

At query 360, the algorithm 300 determines if the vehicle transmission is in park position or neutral position. If yes, the vehicle transmission is in park position or neutral position, then the algorithm 300 continues at query 370.

At query 370, the algorithm 300 queries whether the vehicle is moving, i.e., whether unwanted vehicle motion is detected. If yes, the vehicle 20 is moving, then algorithm 300 proceeds to operation 340 as described above.

In certain embodiments, at query 370, the algorithm 300 determines whether the vehicle is moving by comparing sensor data to saved or calibratable values. For example, the sensor data may be provided by an IMU and at query 370 the algorithm determines whether the IMU acceleration data is greater than a saved value. Alternatively, sensor data may be provided by a sensor for determining vehicle front wheel rotation or vehicle rear wheel rotational velocity. In each case, the sensor data is compared to saved or calibratable values to determine whether the vehicle is moving.

From query 370, if the algorithm determines that the vehicle is not moving, then algorithm 300 may restart with query 310.

From query 360, if the algorithm 300 determines that vehicle transmission is not in park position and is not in neutral position, then the algorithm 300 may restart with query 310.

Thus, the algorithm 300 provides for activating a trailer brake automatically and independently without manual input.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for preventing unwanted movement of a trailer coupled to a towing vehicle, the method comprising:
   obtaining sensor data via one or more sensors of the towing vehicle indicating movement of the towing vehicle and/or trailer; and
   in response to an indication of movement of the towing vehicle and/or trailer, automatically activating a trailer brake to prevent movement of the trailer;
   wherein the towing vehicle is in parking position and is turned OFF.

2. The method of claim 1, further comprising:
   loading a towed vehicle onto the trailer;
   wherein obtaining sensor data via one or more sensors of the towing vehicle indicating movement of the towing vehicle and/or trailer is performed while loading the towed vehicle onto the trailer.

3. The method of claim 1, wherein obtaining sensor data via one or more sensors of the towing vehicle indicating movement of the towing vehicle and/or trailer comprises obtaining sensor data via one or more sensors of the towing vehicle indicating movement of the towing vehicle or indicating rotation of a front wheel of the towing vehicle.

4. The method of claim 1, wherein obtaining sensor data via one or more sensors of the towing vehicle indicating movement of the towing vehicle and/or trailer comprises obtaining sensor data from an inertial measurement unit (IMU).

5. The method of claim 1, further comprising:
   communicating an alert that the trailer brake has been automatically activated to a vehicle operator.

6. The method of claim 1, further comprising:
   automatically de-activating the trailer brake after a predetermined period of time.

7. The method of claim 1, wherein automatically activating the trailer brake to prevent movement of the trailer further comprises automatically activating a parking brake of the towing vehicle.

8. The method of claim 1, wherein a control module determines that the towing vehicle and/or trailer is moving and directs activation of the trailer brake to prevent movement of the trailer.

9. The method of claim 8, wherein the control module:
   determines that the trailer is connected to the towing vehicle;
   determines that the towing vehicle is OFF;
   determines that the towing vehicle is in the parking position;
   determines whether the sensor data is within calibratable values; and
   activates a trailer brake power module to activate the trailer brake to prevent movement of the trailer.

10. The method of claim 9, wherein the control module:
    activates a parking brake of the towing vehicle if the parking brake is not activated.

11. The method of claim 9, wherein the control module activates the trailer brake independently without manual input.

12. A system for braking a trailer connected to a towing vehicle, the system comprising:
    a trailer brake operative to prevent rotation of wheels of the trailer, wherein the trailer brake is OFF when unpowered;
    a trailer brake power module coupled to the trailer brake to selectively provide power to the trailer brake;
    a switch operable by an operator to activate the trailer brake power module to selectively provide power to the trailer brake for a selected period of time;
    one or more sensors of the towing vehicle configured to obtain sensor data indicating movement of the towing vehicle and/or trailer; and
    a control module, wherein the control module is configured to:
    determine that the trailer is connected to the towing vehicle;
    determine whether the towing vehicle is OFF or ON;

determine that the towing vehicle is in a park position or a neutral position;

determine whether the trailer brake is activated;

determine whether the sensor data is within calibratable values; and activate the trailer brake power module to activate the trailer brake to prevent movement of the trailer for a selected period of time.

13. The system of claim 12, wherein the switch is remote from the towing vehicle.

14. The system of claim 12, wherein the control module is configured to determine whether the towing vehicle and/or trailer is moving based on the sensor data.

15. The system of claim 12, wherein the control module is configured to communicate an alert that the trailer brake has been automatically activated to the operator.

16. A vehicle comprising:

a vehicle body configured to be coupled to a trailer having a trailer brake;

one or more sensors configured to obtain sensor data for the vehicle;

a processor that is coupled with the one or more sensors and that is configured to:

determine that the trailer is connected to the vehicle;

determine whether the vehicle is OFF or ON;

determine that the vehicle is in a park position or a neutral position;

determine whether the trailer brake is activated;

determine from the sensor data whether the vehicle and/or the trailer is moving;

activate the trailer brake to prevent movement of the trailer for a selected period of time; and communicate an alert that the trailer brake has been automatically activated to a vehicle operator.

17. The vehicle of claim 16, further comprising a manual switch operable by the vehicle operator to activate the trailer brake for a selected period of time.

18. The vehicle of claim 16, wherein a manual switch that is remote from the vehicle is operable by the vehicle operator to activate the trailer brake for a selected period of time.

19. The vehicle of claim 16, wherein the processor is configured to activate a parking brake of the vehicle if the parking brake is not activated.

20. The vehicle of claim 16, wherein the processor is configured to determine whether the vehicle and/or trailer is moving based on the sensor data.

* * * * *